United States Patent [19]

Enns

[11] Patent Number: 5,100,216
[45] Date of Patent: Mar. 31, 1992

[54] MODULAR FURNITURE

[76] Inventor: Lyle Enns, 9313 Chelsea Court, Vernon, British Columbia, Canada, V1B 2M7

[21] Appl. No.: 582,344

[22] Filed: Sep. 14, 1990

[30] Foreign Application Priority Data

Sep. 29, 1989 [CA] Canada .................................. 614923

[51] Int. Cl.⁵ ................................................ A47B 88/00
[52] U.S. Cl. ....................................... 312/263; 108/111
[58] Field of Search ................................ 108/111, 153; 312/257.1, 263, 264, 195

[56] References Cited

U.S. PATENT DOCUMENTS

| | | |
|---|---|---|
| 3,178,245 | 4/1965 | Morioka et al. |
| 3,547,472 | 12/1970 | Ehrman |
| 3,596,942 | 8/1971 | Zoebelein ........................ 108/111 X |
| 3,743,373 | 7/1973 | Camper et al. |
| 3,836,218 | 9/1974 | Hallal |
| 3,876,270 | 4/1975 | White |
| 4,226,488 | 10/1980 | Vincent |
| 4,418,967 | 12/1983 | Winkelman et al. .......... 312/111 X |
| 4,470,647 | 9/1984 | Bishoff et al. .................. 312/311 |
| 4,660,901 | 4/1987 | Shimada ......................... 312/263 X |
| 4,886,326 | 12/1989 | Kuzyk ............................. 108/153 X |

*Primary Examiner*—Joseph Falk
*Attorney, Agent, or Firm*—Dennison, Meserole, Pollack & Scheiner

[57] ABSTRACT

There is described an improved system for the assembly of furniture and like items, comprising flat surface panels having a plurality of peripheral edges thereabout, longitudinally extending grooves formed in one or more of the peripheral edges, edge members for covering selected ones of the peripheral edges and connectors corresponding in cross-sectional shape with the grooves for slidable engagement therewith. The connectors each have a base and a groove engaging portion, wherein each connector is connectable along its base to a respective one of the surface panels or edge members. A surface panel or edge member may be assembled to another surface panel by means of a slidable connection between the groove engaging portion of the connectors thereon and the groove in an abutting edge of the other surface panel.

6 Claims, 3 Drawing Sheets

MODULAR FURNITURE

FIELD OF THE INVENTION

The present invention relates to a system for assembling articles of manufacture and more particularly to a system permitting the assembly of furniture modules from a relatively few basic components, and the assembly of different modules from the same group of basic components.

BACKGROUND OF THE INVENTION

The advantages of customer assembled or "knock-down" furniture have long been recognized. Such furniture can generally be sold at a reduced price due to lower manufacturing and transportation costs. The savings arise principally from elimination of factory assembly and substantially reduced shipping volumes. The purchaser himself may wish to disassemble the furniture periodically when moving from one locale to another.

Previous knock-down systems suffer from several disadvantages, including complexity, multiplicity of parts, lack of flexibility, visible connectors or unfinished edges appearing on the assembled product detracting from its aesthetic appeal and obviously marking it as knock-down furniture.

SUMMARY OF THE INVENTION

It is an object of the present invention to obviate and mitigate from the disadvantages of the prior art.

It is a further object of the present invention to provide a system for the assembly of furniture and like items comprising as few as three basic components.

According to the present invention then, there is provided a system for the assembly of furniture and like items, comprising flat surface panels having a plurality of peripheral edges thereabout, longitudinally extending grooves formed in one or more of said peripheral edges, edge members for covering selected ones of said peripheral edges; and connector means corresponding in cross-sectional shape with said grooves for slidable engagement therewith, said connector means having a base and a groove engaging portion, wherein said connector means are connectable along said base thereof to a respective one of said surface panels or edge members, whereby said surface panel or edge member may be assembled to another surface panel by means of a slidable connection between the groove engaging portion of said connector means thereon and the groove in an abutting edge of said another surface panel.

BRIEF DESCRIPTION OF THE DRAWINGS

Preferred embodiments of the present invention will now be described in greater detail and will be better understood when read in conjunction with the following figures, in which.

DETAILED DESCRIPTION

Figure 1:
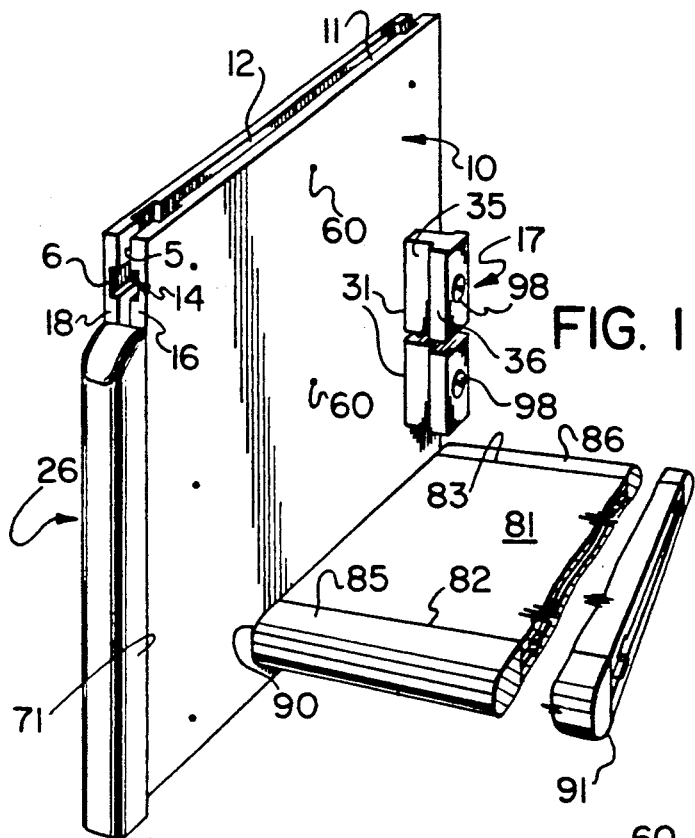
FIG. 1 is a perspective view of a furniture module including the system's basic components.

With reference to FIG. 1, there is shown an exemplary module comprising the basic components of the present system consisting of planar surface panels 10 used for top, bottom and side surfaces as well as internal dividers or shelf surfaces, connectors 17 and edge members 26. Members 26 are typically in the nature of moldings intended to cover exposed peripheral edges 11 of surface panels 10.

Each surface panel 10 has in one or more of its peripheral edges 11 a longitudinally extending groove 12. Each groove 12 may extend the whole or part of the length of the peripheral edge in question, with at least one end 14 of the groove opening outwardly through external peripheral surface 16 of the adjacent peripheral edge 18. For purposes of obtaining maximum flexibility of use, each peripheral edge of each surface panel is typically formed with a groove 12 extending completely therethrough.

Grooves 12 are advantageously T-shaped as shown, including a stem 5 and an enlarged portion or head 6 defining the T's cross-stroke.

Each groove 12 is shaped and adapted to slidably engage connectors 17. As will be seen most clearly from FIGS. 1 and 2, connectors 17 correspond in cross-sectional shape and size with the shape and size of grooves 12 for a tight but slidable fit therein. Thus, each connector includes a base 31, and a groove engaging portion consisting of stem 35 and an enlarged portion 36 for engaging stem 5 and portion 6 of groove 12, respectively.

Figure 2:
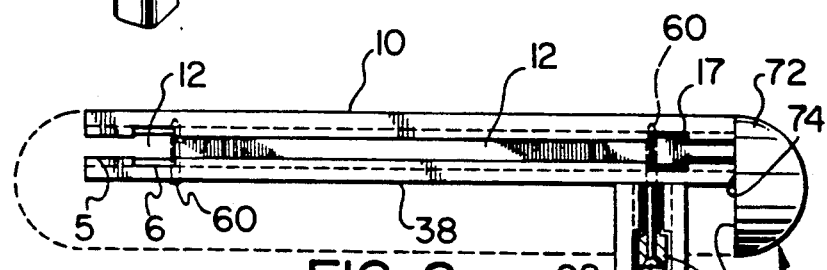
FIG. 2 is a side elevational view showing the connection between adjacent surface panels of the present system.

With reference to FIG. 2, to connect, for example, one surface panel 3 to another 10 at right angles, one or more connectors 17 are attached in longitudinal alignment to the appropriate surface 38 of panel 10. Groove 12 in panel 3 is aligned with the connectors and then slid into place thereover to achieve a firm but slidable connection between the two panels. The process is repeated on the opposite side of the module and then a bottom surface/shelf can be installed over connectors such as 40 fastened to inner opposite surfaces of side surface panels 3.

Connectors 17 may be glued in place, or more advantageously are connected using threaded fasteners 98 such as screws. Threaded fasteners are preferred as obviously this facilitates the addition and removal of connectors as required.

If a front or back surface is required, the same can be installed over vertically aligned connectors 42. If desired, the side surface panels can be manufactured with a plurality of pre-drilled holes 60 (FIG. 1) to readily and accurately locate connectors for shelves/dividers, vertical partitions and so forth. Holes 60 are drilled to a depth approximately three quarters of the way through the panels to provide maximum strength. Holes 60 drilled closest to the peripheral edges of the panel partially penetrate the inner edge of the adjacent groove 12 as seen most clearly in the upper right hand corner of FIG. 2. This permits a screw inserted into the hole in question to engage a connector 17 in the groove to lock the connector in place, if this is desired.

Figure 3:
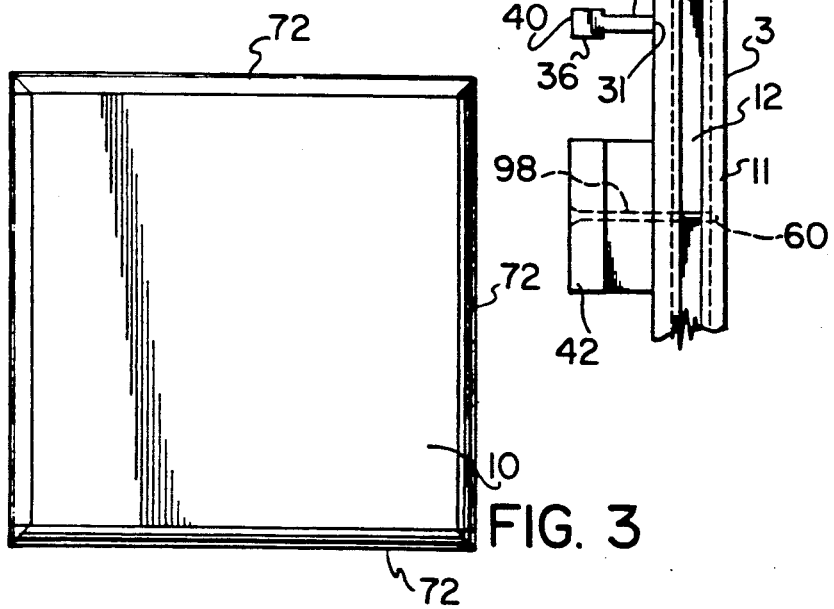
FIG. 3 is a plan view of a top surface panel showing the assembly of edge members thereon.
Figure 4:
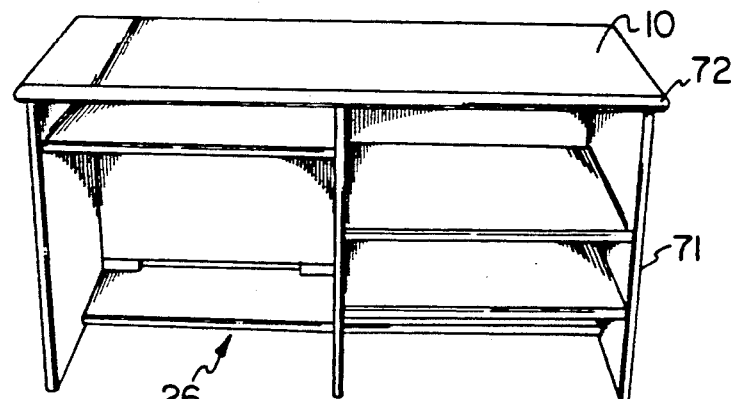
FIG. 4 is a perspective view of an assembled furniture module comprising the present system's components.
Figure 5:
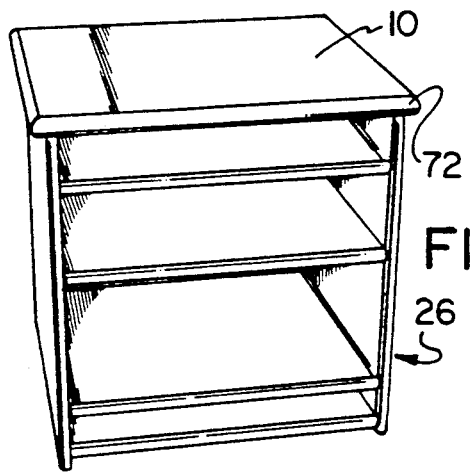
FIG. 5 is a perspective view of an additional completed module.

Depending upon the sort of table, cabinet, etc. assembled using the present system, a number of peripheral edges of side panels 10 will be visible and obviously, to impart a finished appearance such as shown with respect to the completed modules of FIGS. 4 and 5, these edges should be decoratively trimmed. In the present system, this is accomplished using edge members 26 such as wooden moldings 71 (FIG. 1) or 72 (FIGS. 2 and 3) of any desired cross-sectional shape and with a flat side, as illustrated, for engagement with a peripheral edge. For table and cabinet tops, an enlarged molding such as 72 may be preferred, the molding having one or more connectors 17 fastened to the flat rear surface 74 thereof for slidably engaging groove 12 in top surface panel 10. The overhang 76 of molding 72 will abut the vertical edges of the underlying side surface panels, to prevent top surface panel 10 from moving or being removed until at least one of moldings 72 is itself removed.

Figure 8:
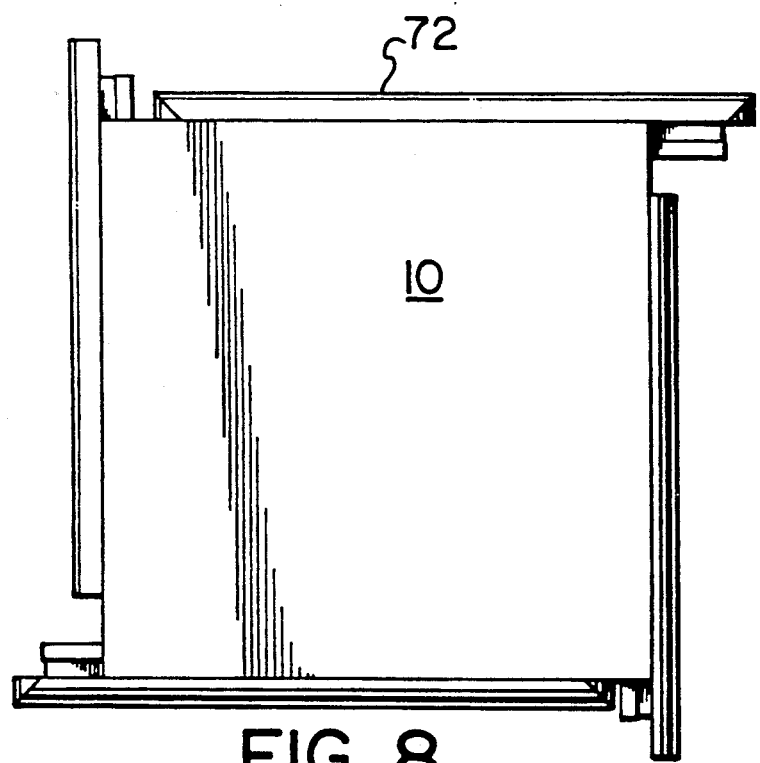
FIG. 8 is a plan view of the top surface panel of FIG. 3 showing the edge members in a partially disassembled condition.

FIG. 8 shows moldings 72 in a partially disassembled position as compared to the assembled condition of the moldings shown in FIG. 3.

For the remaining vertical and horizontal edges, a molding 71 of a thickness substantially the same as the thickness of the surface panels themselves may be used, again using one or more connectors 17 to engage respective groove 12 in the edge of the surface panel being trimmed.

Figure 6:
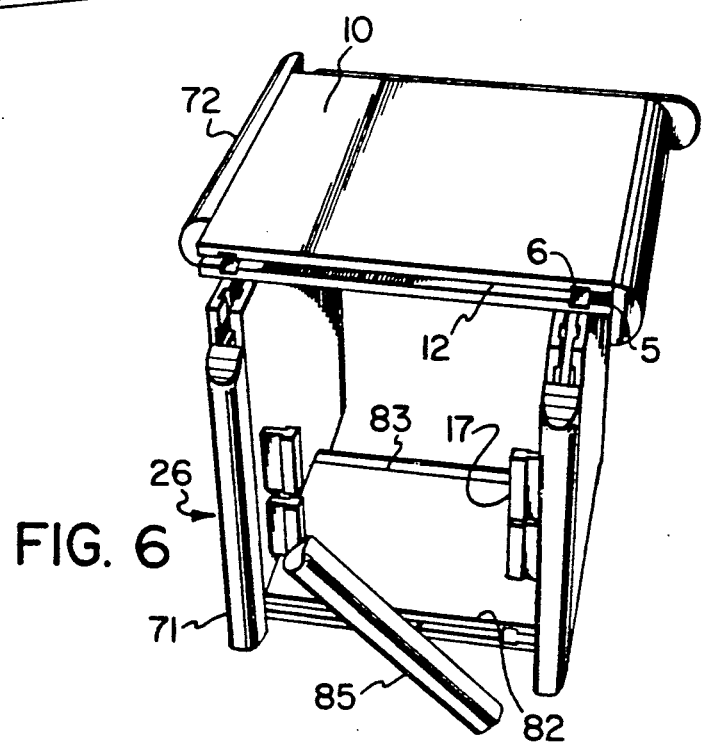
FIG. 6 is a perspective view of a partially disassembled module.
Figure 7:
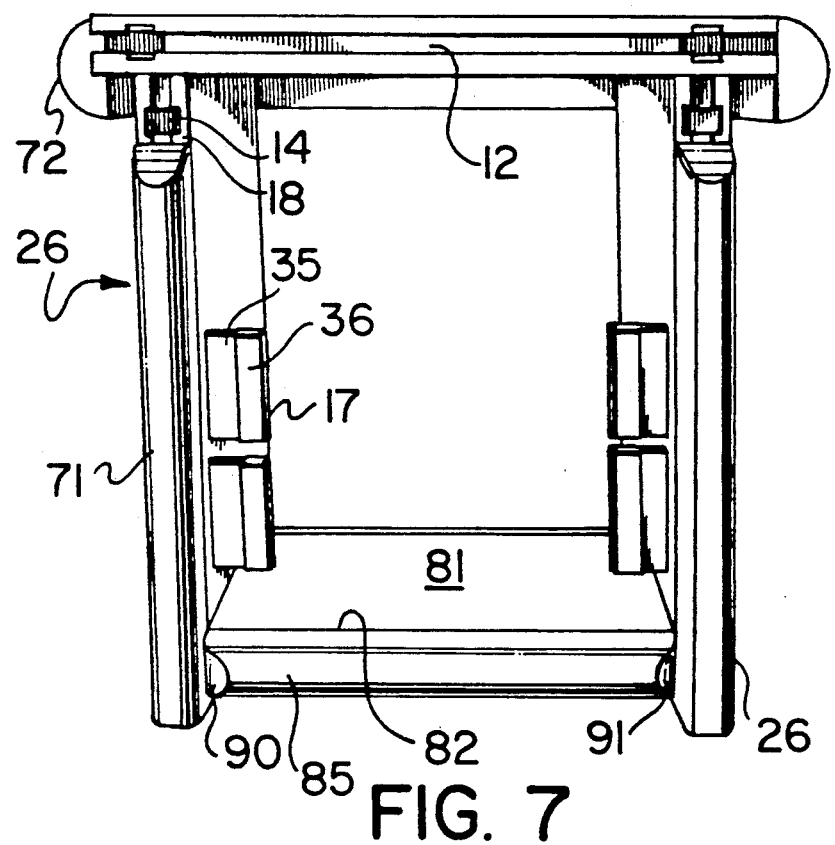
FIG. 7 is a frontal view of the module of FIG. 6.

In the case of shelves or bottom surfaces such as 81 shown in FIG. 1, it is often desirable to trim both the front and rear edges 82 and 83 using moldings such as 85 and 86. Obviously, only one molding can be installed before installation of the shelf itself in order that grooves 12 in the edges of the shelf are exposed for engagement with connectors 17. This problem is easily overcome by using only one connector to secure rearmost molding 85, so that the molding can be pivoted or twisted around the connector as shown in FIG. 6. When the molding is pivoted to expose grooves 12, the shelf may be installed and the molding then rotated into its proper position as shown in FIG. 7, where it will remain due to the frictional abutment between its respective ends 90 and 91 and the vertically adjacent moldings 26.

The units shown in FIGS. 4 and 5 are merely exemplary of completed desks easily fabricated using the present system. The components of the desks can be disassembled and used in the assembly of another desk, table or cabinet, and indeed the modules can themselves be expanded using the above-described components of the present system.

I claim:

1. A system for the assembly of furniture and like items, comprising:
   panels with flat surfaces and a plurality of peripheral edges thereabout;
   longitudinally extending grooves in selected ones of said peripheral edges;
   edge members for covering selected ones of said peripheral edges having said grooves formed therein; and
   discrete connectors individually and selectively connectable to said panel flat surfaces and to said edge members for slidable engagement with said grooves, said connectors each having a flat base mountable against said flat surfaces and said edge members, and a groove engaging portion extending from said base and corresponding in cross-sectional shape to said grooves, said corresponding shapes of said grooves and said groove engaging portions precluding lateral engagement and disengagement of said groove engaging portions into and out of said grooves, each of said panels and said edge members being assemblable to another panel solely by a slidable engagement between said groove engaging portion of a connector thereon and a groove in an abutting edge of said another panel.

2. The system of claim 1 wherein said grooves are T-shaped in cross-sectional configuration.

3. The system of claim 1 wherein said grooves extend the entire length of said peripheral edges.

4. The system of claim 3 wherein selected ones of said connectors are mounted by driven fasteners extending therethrough, said panels including a plurality of pre-drilled holes therein spaced from said peripheral edges thereof for selective attachment of connectors thereto to define additional points of connection for assembly of additional panels.

5. The system of claim 1 including holes defined transversely through selected ones of said panel surfaces and intersecting selected ones of said grooves, and driven fasteners insertable into said holes for locking engagement with groove received connectors.

6. The system of claim 1 including fastener means for securing one of said connectors to one of said edge members for pivotal rotation of said one edge member relative to said one connector whereby said one edge member is rotatably adjustable relative to an edge grove receiving said one connector.

* * * * *